United States Patent [19]
LaBarber

[11] 3,921,255
[45] Nov. 25, 1975

[54] METHOD FOR EVISCERATING POULTRY AND THE LIKE

[75] Inventor: Joseph A. LaBarber, Kern City, Calif.

[73] Assignee: Nebraska Technical Equipment Company, Aurora, Nebr.

[22] Filed: Apr. 17, 1973

[21] Appl. No.: 351,906

Related U.S. Application Data

[63] Continuation-in-part of Ser. No. 265,953, June 23, 1972, Pat. No. 3,786,535.

[52] U.S. Cl. .................................................. 17/11
[51] Int. Cl.² ..................... A22B 3/08; A22B 21/00
[58] Field of Search............................ 17/11, 12, 45

[56] References Cited
UNITED STATES PATENTS

| | | | |
|---|---|---|---|
| 2,795,815 | 6/1957 | Dahlberg | 17/11 |
| 2,943,346 | 7/1960 | Jensen | 17/11 |
| 3,526,018 | 9/1970 | Lovitt | 17/11 |

Primary Examiner—Hugh R. Chamblee
Assistant Examiner—Robert F. Cutting
Attorney, Agent, or Firm—Lowe, King, Price & Markva

[57] ABSTRACT

A dressing tool includes a rotatable cutting means with an elongated probe member coaxially disposed therein. The probe member extends outwardly beyond the cutting means. The alimentary canal is cleaned by drawing a vacuum through the elongated probe which is to be inserted into the anus of the poultry. The anus is then drawn away from the body of the poultry by drawing a vacuum in the space between the probe and the cutting means. Another feature of this invention is directed to the use of a control mechanism to provide the necessary sequence of operations so that the dressing tool will operate automatically under assembly line conditions.

12 Claims, 5 Drawing Figures

METHOD FOR EVISCERATING POULTRY AND THE LIKE

RELATED APPLICATION

This is a continuation-in-part of parent application Ser. No. 265,953 filed June 23, 1972 now U.S. Pat. No. 3,786,535 dated Jan. 22, 1974.

BACKGROUND OF THE INVENTION

Dressing tools operating under compressed air and vacuum lines are very well known in the prior art. Such prior art dressing tools which are hand held are disclosed in U.S. Pat. Nos. 2,590,785, 3,147,513 and 3,526,018. These prior art dressing tools or eviscerators generally use a rotatable cutting member in combination with a vacuum drawing mechanism to cut the area around the anus and pull the entrails from the poultry being cleaned. The main problem associated with the latter two patented devices is that the main intestine is not supported during the cutting operation. There is an extreme danger that the main intestine itself may be severed and the poultry consequently contaminated during the cutting operation.

The poultry dressing tool as disclosed in U.S. Pat. No. 2,590,785 uses a solid threaded probe which is inserted into the external opening of the main intestine and acts only as a guide for the rotating cutter. In that particular prior art device, the pilot or guide rotates as it enters the vent to provide support for the portion of the fowl to be removed.

In all of these prior art devices, the dressing or cleaning operation and the sequence associated with the operation of the dressing tools is left completely to the operating personnel. The cleaning operation, therefore, is only as fast as the particular operating personnel happens to be. In addition, there in no insurance that the poultry being cleaned with these devices will remain uncontaminated due to misplacement of the rotating cutting device or a lack of removal of any waste material present in the main intestine.

PURPOSE OF THE INVENTION

The primary object of this invention is to provide a dressing tool or eviscerator for poultry and the like wherein the cleaning operation may be effectuated under totally non-contaminating conditions.

Another object of this invention is to provide a hand held dressing tool for poultry and the like which will enable rapid and efficient cleaning of the poultry in a manner that is not completely a function of the particular operating personnel.

A still further object of this invention is to provide a completely automated, program controlled dressing tool for poultry, animals, and the like.

A still further object of this invention is to provide an eviscerator for poultry, animals, and the like wherein the portion of the main intestine adjacent the vent is first evacuated before any cutting is effectuated around the vent.

Another object of the invention is to provide a hand held eviscerator for poultry, animals, and the like which will pull the anus and the entrails outwardly from the fowl for a distance sufficient to allow the grasping thereof for subsequent removal operations.

A still further object of this invention is to provide an eviscerator that is easily handled during the cutting operation and may be thoroughly cleaned automatically as a part of a controlled program by flushing the probe and cutting member with fluid.

SUMMARY OF THE INVENTION

The dressing tool or eviscerator as described herein includes a rotatable cutting means with a probe member coaxially disposed therewith. The elongated probe member is hollow and extends outwardly beyond the cutting means. Means are provided for drawing a vacuum through the elongated probe means after it has been inserted through the external opening of the main intestine for the purpose of removing any waste material lodged therein. Means are provided for pulling a vacuum within the space between the probe member and the rotatable cutting means after the cutting member has been placed against the area surrounding the vent of the poultry. Once the poultry has been cut, the device is pulled away from the poultry thereby carrying with it the alimentary canal along with the fistula without causing any contamination.

Another feature of this invention is directed to the specific automated control of the eviscerator. The entire operation is initiated by depressing a single trigger which actuates the programmed control means to effectuate the automatic sequence of operations.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
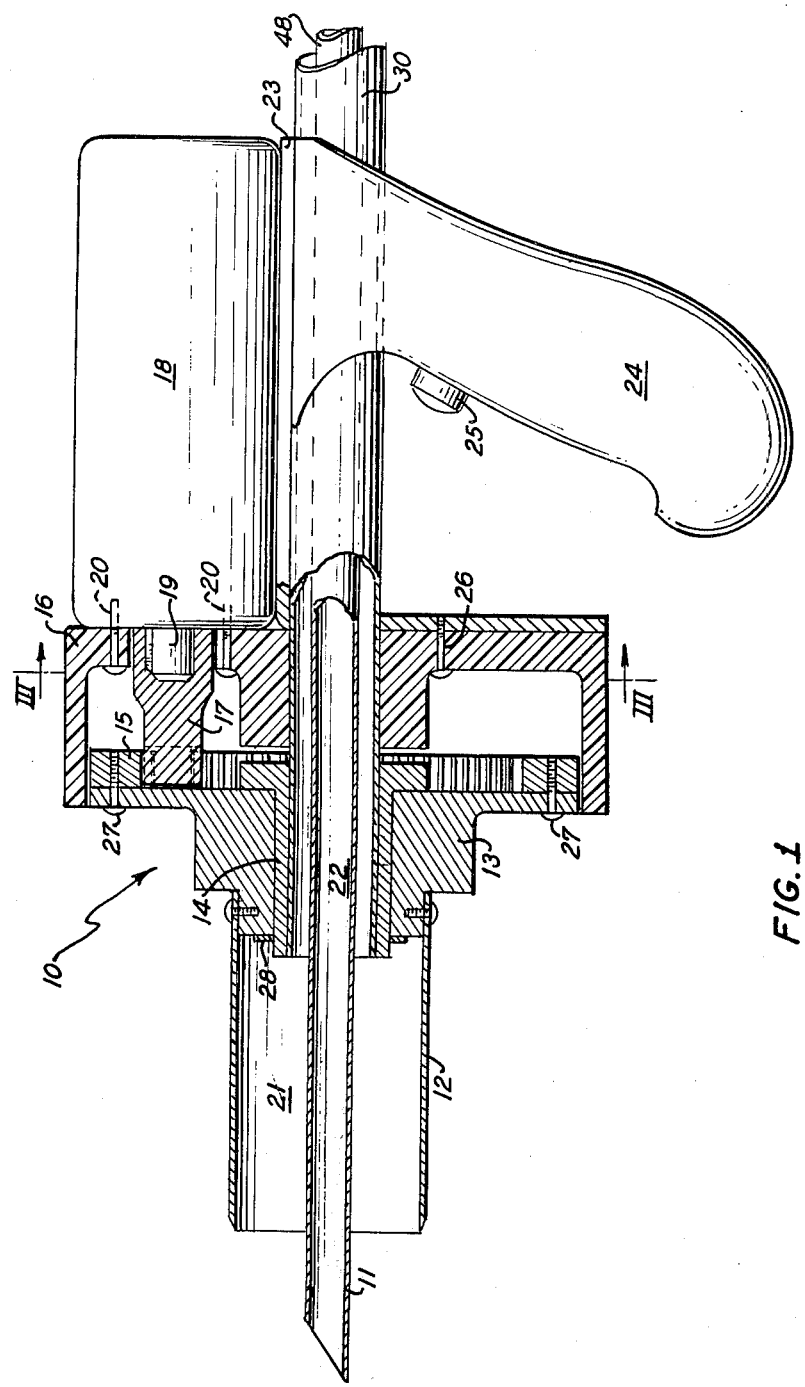
FIG. 1 is a longitudinal sectional view of a dressing tool made in accordance with this invention.
Figure 2:
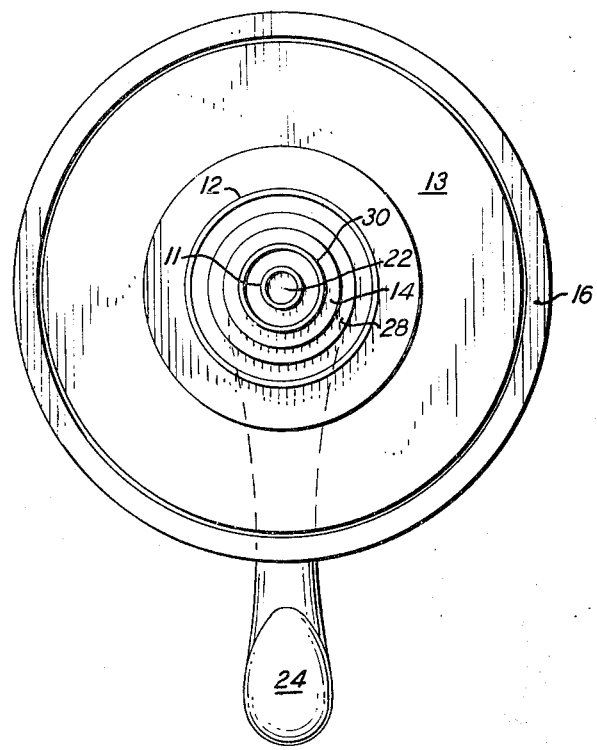
FIG. 2 is a front end elevational view of the device shown in FIG. 1.
Figure 3:
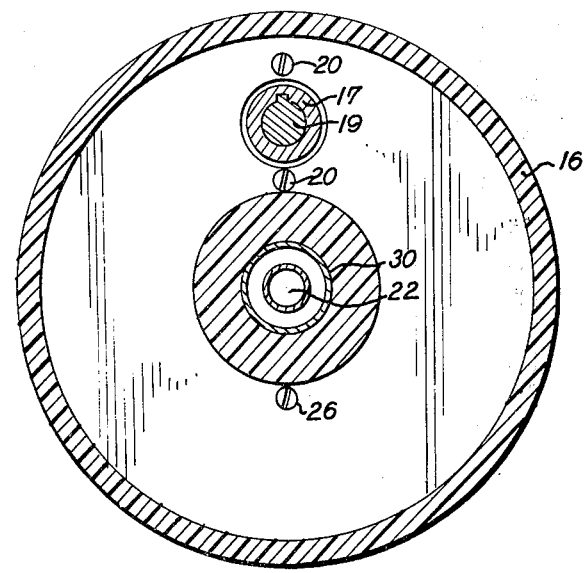
FIG. 3 is a cross-sectional view along line III—III of FIG. 1, and FIGS. 4 and 5 are schematic diagrams showing programmed control mechanisms for systems made in accordance with this invention.

More specifically, a dressing tool, generally designated 10, includes a hollow probe 11 coaxially disposed within a rotatable cutter member 12. The probe 11 extends outwardly beyond the cutting edge of the cutting member 12. The cutting member 12 is mounted on the rotatable mandrel 13 which is mounted on the bushing 14 and held in place by way of the snap ring retainer 28. The bushing 14 is slidably mounted on the hollow tubing 30 so that the entire mandrel rotates around the central axis of the tubing 30 and the probe member 11. The probe is shaped at its end in a suitable manner to facilitate easy insertion thereof into the vent of the fowl. The cutter member 12 may be composed of any desired material which is extremely hard and will hold its cutting edge over an extended period of time. It has been found that stainless steel or hardened tool steel may be used to effectuate the desired results. Various sizes of cutter members 12 may be interchanged very rapidly to accommodate different sized poultry. Any desired connecting means may be used to removably attach the cutter member 12 to the mandrel 13.

An air driven motor 18 is mounted on base bracket 23. The motor shaft 19 extends through an opening in the housing 16 and carries the pinion gear 17 which is in operative contact with the inside gear ring 15.

Screws 27 fixedly attach the gear ring 15 to the mandrel 13. Actuation of the motor 18 therefore will rotate the cutter member 12 about its axis of rotation which is coaxially disposed with respect to the fixedly mounted probe member 11.

The handle member 24 is also attached to the base bracket 23 and includes the trigger 25 which may be depressed to activate the dressing tool. The housing 16 is composed of a plastic material in this specific embodiment. A plastic material such as Lexan, produced by General Electric Co., is substantially unbreakable when used in such an application. Screws 26 are used to hold the housing 16 onto the base member 23.

The handle 24 is shaped in such a manner as to allow the operator to hold the tool 10 at an angle which will facilitate the rapid and accurate placement of the probe 11 into the vent. The handle extends in a direction toward the front of the tool 10 at an angle of greater than 45° and less than 90° with respect to the longitudinal axis of the tool. The desired angle will correspond to the angle at which the poultry is disposed on the moving processing line located in front of the operating personnel.

It is important that all the materials used in this particular apparatus be in accordance with U.S. Department of Agriculture regulations inasmuch as there are no toxic materials to be in contact or near the food product being processed. The apparatus 10 is operated completely through the use of compressed air and vacuum lines thereby eliminating all necessity for the use of electricity in the area of operation. The use of this particular device 10 also eliminates the necessity for the operating personnel to insert a finger into the vent and make the necessary cuts for removal of the alimentary canal.

Figure 4:
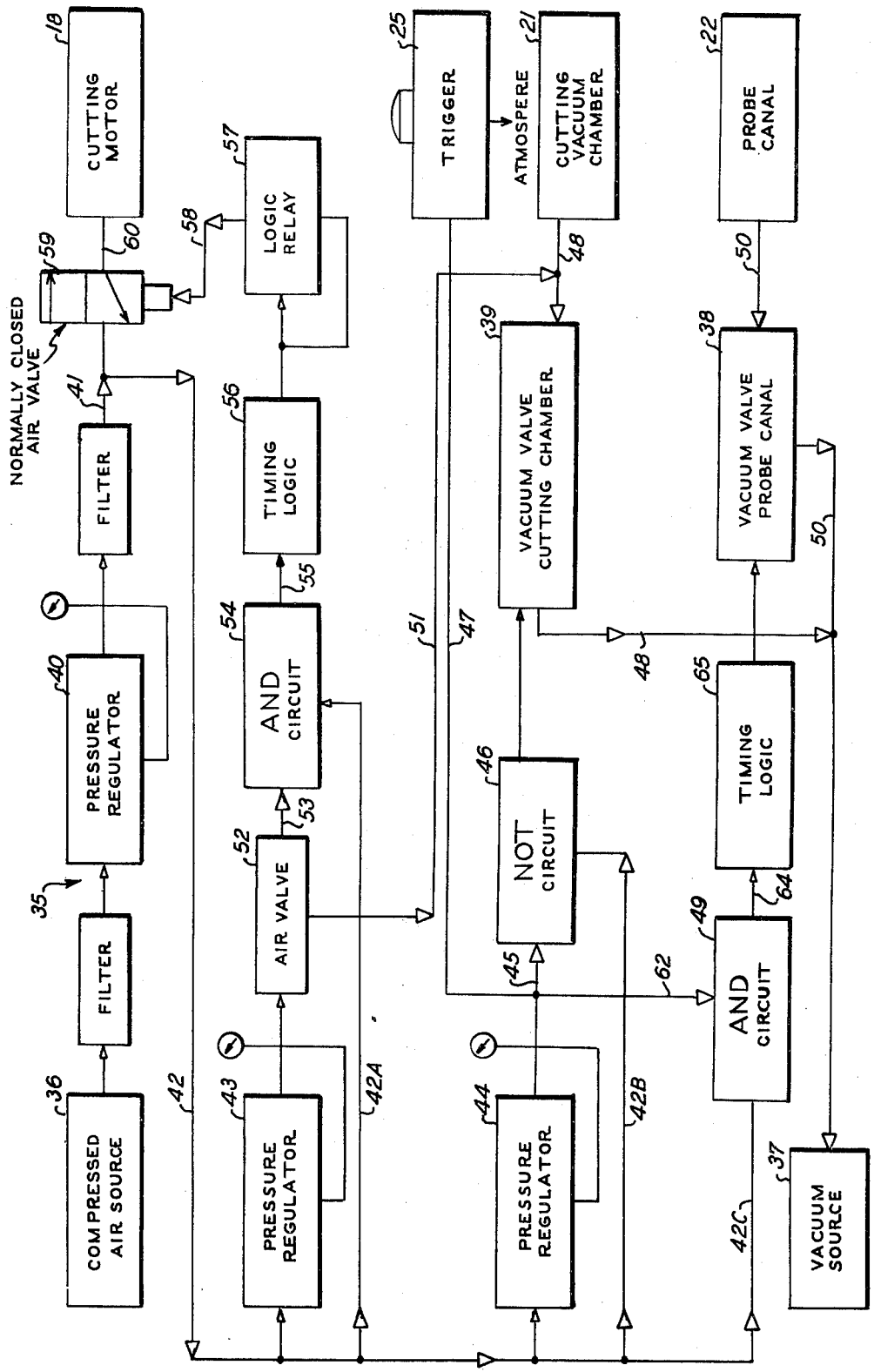
Figure 5:
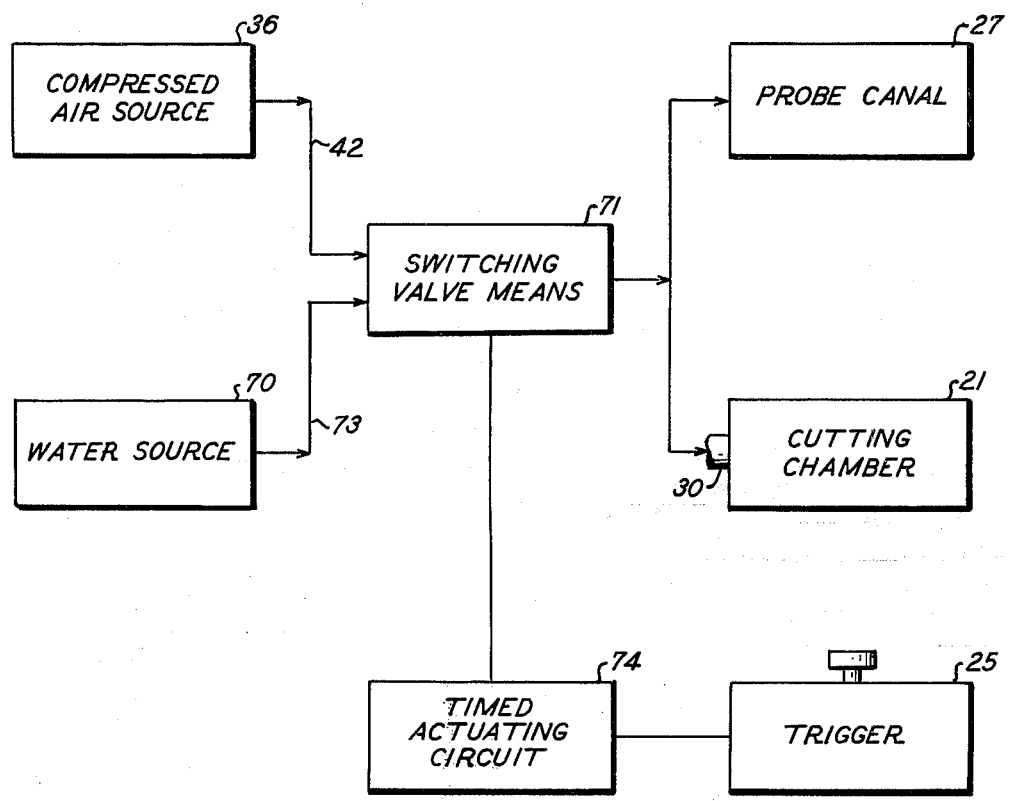

Another feature of this invention is directed to the control mechanism, generally designated 35, and shown schematically in FIG. 4. To operate the dressing tool 10, it is necessary to have a compressed air source 36 and a vacuum source 37. The normal compressed air line is rated at about 80 to 90 p.s.i. and the vacuum lines are rated at about 20 to 25 inches. These particular sources may be already installed in a poultry dressing plant. However, it is possible that the use of a portable compressed air system or a portable vacuum producing system may be incorporated into the control mechanism. This would facilitate the use of the system made in accordance with this invention in any conceivable operation.

The probe canal 22 and the hollow tubing 30 each form vacuum channels and are in operable connection with the vacuum source 37. In this specific embodiment, once the system is turned on, a vacuum is drawn through the probe canal 22. Therefore, when the probe 11 is inserted into the vent, any material present in the main intestine is immediately removed therefrom and deposited in a refuse container of any desired kind (not shown). Such refuse containers are readily available in the prior art and are commonly used in conjunction with vacuum lines generally.

Once the probe member 11 has been inserted fully into the main intestine, the trigger 25 is depressed and the vacuum source 37 is operatively connected to the hollow tubing 30. This hollow tubing 30 opens up into the cutter chamber 21 defined by the space between the inner surface of the annular cutter member 12 and the outer surface of the probe member 11. When the vacuum is drawn on the hollow tubing 30, the anus is drawn into the cutting chamber 21. After a measured, predetermined time interval, the motor 18 is activated to rotate the cutting member knife 12.

After cutting, the anus and alimentary canal are pulled out a sufficient distance to be grasped for subsequent cutting and cleaning operations and the trigger 25 is released. Consequently, the vacuum canals 22 and 30 are open to the atmosphere. The vacuum source 37 remains disconnected from either the probe canal 22 or the hollow tubing 30 for a measured, predetermined time interval to allow the entrails to be removed from the eviscerator 10. After the time interval has elapsed, the probe canal 22 is automatically once again operatively connected to the vacuum source 37 and the tool 10 is in a ready position for insertion into the next poultry carcass.

In order to effectuate the above described sequential operation, the control mechanism 35 as shown in FIG. 4 may be used. The control mechanism includes a vacuum valve 38 which is located between the probe canal 22 and main vacuum source 37. The vacuum valve 38 is normally open and allows the vacuum to draw on the probe canal 22 at the time the system is initially started. A vacuum valve 39 is disposed between the cutter vacuum chamber 21 and the vacuum source 37. The vacuum valves 38 and 39 are operated by compressed air at about 1 p.s.i. A first pressure regulator 40 is disposed after the compressed air source 36 and reduces the air pressure to from about 40 to 60 p.s.i. for the balance of the system.

Line 42 directs compressed air into the pressure regulators 43 and 44 where the line pressure is reduced to about 1 p.s.i. The NOT logic circuit 46 maintains the vacuum valve 39 in a normally closed condition as long as a pressure of 1 p.s.i. is present at the input port 45. Upon depression of the trigger 25 the 1 p.s.i. pressure of air at the input port 45 is bled off into the atmosphere through line 47. Consequently, NOT circuit 46 into which supply line 42A is directed now produces an output signal activating vacuum valve 39 thereby connecting cutting chamber 21 to vacuum source 37 by way of line 48. It is at this time that the anus is held tightly against the vacuum chamber 21.

The vacuum on line 48 will produce a vacuum on the valve actuating line 51 thereby causing air valve 52 to be energized. Once air valve 52 is actuated, an impulse is produced at port 53 of the AND logic amplifier 54 which is connected to line 42 by way of line 42A. Once input impulses are present at both the input of line 42A and input port 53, a pressure impulse is produced at output 55 to activate the timing logic circuit 56. The timing logic circuit 56 delays the activating of cutting motor 18 for an amount of time sufficient to allow the anus to be adequately pulled into the cutting chamber 21.

After a predetermined time interval, an impulse is released from the timing logic circuit 56 and fed into the air logic relay 57. An air time signal is then sent over line 58 to open the normally closed air valve 59. Upon opening of the air valve 59, air is released on line 60 to actuate the cutting motor 18 thereby rotating the cutting member 12. Through the use of this circuitry, it is possible to carefully control both the speed and the number of revolutions per minute that the cutter member 12 will turn while it is drawn into contact with the area around the anus.

The cutter member 12 will stop rotating automatically at the end of a predetermined time interval controlled at the logic relay circuitry 57. All of the logic devices used in the control mechanism 35 are old and well known and may be obtained commercially.

Once the cutting member 12 has stopped rotating, the operator extracts the anus and alimentary canal from the poultry carcass. Once the extraction has been effected, trigger 25 is released thereby causing a 1 p.s.i. buildup at port 45 of the NOT logic circuit 46 and input port 62 of the AND circuit 49. Activation of the NOT circuit 46 eliminates the signal impulse to vacuum valve 39 and the vacuum is thus disconnected from line 48 and the cutting vacuum chamber 21. At this point in the operation, the anus and the alimentary canal are released from the vacuum chamber 21.

Additionally, after trigger 25 is released, the 1 p.s.i. pressure is also present at the input port 62 of the AND logic circuit 49 which is also in contact with the line 42 via line 42C. The resulting signal impulse on output 64 is sent into the timing logic circuit 65. Consequently there is a delay of a predetermined time interval before a signal impulse reopens vacuum valve 38.

It is during this time interval when the vacuum is off both the cutter chamber 21 and the probe canal 22 that the anus and alimentary canal are released from the end of the dressing tool 10. Once the valve 38 is again automatically opened, the line 50 is again openly connected to the vacuum source 37 to draw a vacuum through the probe canal 22 and the dressing tool 10 is then ready for the operation to be repeated on the next poultry carcass.

The trigger 25 is depressed only after probe 11 has been inserted into the vent of the next carcass. Consequently, the line 47 is opened to the atmosphere and bleeds the 1 p.s.i. pressure off the input port 45 of the NOT circuit 46 and the input port 62 of the AND circuit 49. Therefore, the vacuum valve 39 is opened and the cutting vacuum chamber 21 is connected to vacuum source 37 and at substantially the same time, the vacuum valve 38 is closed thereby disconnecting the probe canal 22 from the vacuum source 37.

Another feature of this invention is directed to the use of an automatic wash cycle which is activated during the time that the vacuum source 37 remains disconnected from either the probe canal 22 or the hollow tube 30. As discussed hereinabove, the vacuum source 37 may remain disconnected from ducts or canals 22 and 30 for a measured, predetermined time interval to allow the entrails to be removed from the eviscerator 10.

In this feature of the invention, the entrails including the alimentary canal and vent or anus are removed from the eviscerator 10 upon the release of the trigger 25. That is, when trigger 25 is released, the compressed air source 36 is opened to the probe canal 22 and cutting chamber 21 via the hollow tubing 30. This initial air blow is followed by a water blow when a flow of water is directed from water source 70 into the probe canal 22 and hollow tubing 30 by the switching valve means 71. After a predetermined time interval, the water blow is stopped and a further air blow is effectuated to remove any water from the probe canal or cutting chamber before the tool 10 is in a ready position for insertion into the next poultry carcass.

The water used in this washing cycle is filtered and may contain disinfectant materials for cleaning and disinfecting the cutting tool 12. Water that is forced through the probe canal 22 and hollow tubing 30 will wash any solid material away from the probe 11 and the cutting member 12. The water will flush out the vacuum chamber 21 and clean off the outer cutting edge of the cutting member 12 and the outer edge of the probe 11. The compressed air may be drawn from line 42 which is connected to the compressed air source as shown in FIG. 4.

A timed actuating circuit 74 may include the necessary timing logic circuitry and/or logic relay circuitry necessary to control the switching valve means 71 for effectuating the desired results as stated hereinabove. The compressed air source 36 and water source 70 are in a normally closed condition. That is, the time actuating circuit 74 is merely armed or placed in a ready position at the time the trigger 25 is initially depressed. Any desired logic circuitry may be used to effectuate this readying of the actuating circuit 74. It is during this ready position that the vacuum and cutting portion of the cycle as discussed hereinabove is accomplished. That is, vacuum is pulled through the probe canal 22, then through the cutting chamber 21 followed by the operation of the cutter member 21 by the cutting motor 18. After the entrails have been separated and removed from the carcass, trigger 25 is released thereby energizing the actuating circuit 74 from its armed or ready position. The actuating circuit 74 then operates during a predetermined time interval in the manner described hereinabove. As soon as the wash cycle has finished, the probe 22 is automatically once again operatively connected to the vacuum source 37 and the tool 10 is again in a ready position for insertion into the next poultry carcass.

Both the hollow probe canal 22 and hollow tubing 30 are filled with either air or water during the air and water blowing steps, respectively, of the flushing cycle. It is clear that the supply of water may be limited to the hollow tubing 30 thereby washing off both the probe member 11 and the cutting member 21 at the same time. It is possible also that a mixture of air and water might be used to constitue the fluid used during the washing or flushing cycle for cleaning the tool 10 between each cutting operation.

While the method and apparatus for eviscerating poultry and the like has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A method for eviscerating poultry and the like comprising the steps of:
   a. inserting a hollow probe member through the vent into the main intestine of a poultry carcass,
   b. drawing a vacuum through said hollow probe to remove waste from said main intestine,
   c. forming a closed annular zone aroung said vent,
   d. drawing a vacuum within said annular zone,
   e. cutting the carcass of the poultry along the periphery of the annular vacuum zone while the vacuum is being drawn therein,
   f. separating the anus and alimentary canal from the poultry carcass after the cutting step has been completed, and
   g. blowing a fluid material through the hollow probe member and vacuum zone to remove the anus and alimentary canal from the probe member and annular zone.

2. A method as defined in claim 1 wherein said fluid material is water.

3. A method as defined in claim 1 wherein the fluid material blowing step includes a sequential application of air, water, and air in the stated order.

4. A method as defined in claim 1 wherein the fluid material is a mixture of air and water.

5. A dressing tool for poultry and the like comprising:
   a. a rotatable cutting means,
   b. an elongated, hollow probe means coaxially disposed within said rotatable cutting means and extending outwardly beyond the cutting means,
   c. first means for drawing a vacuum through the elongated probe means,
   d. second means for drawing a vacuum in the space between the probe means and the rotatable cutting means,
   e. means for rotating said cutting means while said second vacuum drawing means is being operated, and
   f. means for flushing the cutting means and hollow probe means with a fluid material for removing from the dressing tool the portion of the poultry being cut and separated from the poultry carcass.

6. A dressing tool as defined in claim 5 wherein said flushing means includes a valve for introducing fluid from a fluid source into the hollow probe means and the space between the probe means and the rotatable cutting means.

7. A dressing tool as defined in claim 5 wherein control means are operatively connected to said rotatable cutting means, said first and second vacuum drawing means and said flushing means to provide automatic sequential operation thereof upon actuation of said dressing tool.

8. A dressing tool as defined in claim 7 wherein said first vacuum drawing means includes a line extending from a vacuum source to the hollow probe means,
said control means includes a valve means located in said vacuum line and an AND logic circuit and a timing logic circuit,
said timing logic circuit being connected to the output of the AND circuit and the input of the valve means.

9. A dressing tool as defined in claim 7 wherein said control means includes means for sequentially activating the first vacuum drawing means, said second vacuum drawing means and said rotating means in their sequential order to effectuate the evisceration of a poultry or animal carcass.

10. A method as defined in claim 1 including a pressing and releasing a trigger means to effect automatic activation of the vacuum drawing, cutting and blowing steps.

11. A dressing tool as defined in claim 5 wherein said tool has a structural configuration effective to be held in the hand of an operator.

12. A dressing tool as defined in claim 7 wherein said control means includes a trigger means movable between a depressed position and a released position to activate said drawing, rotating and flushing means.

* * * * *